(12) United States Patent
Bauer

(10) Patent No.: US 8,920,033 B2
(45) Date of Patent: Dec. 30, 2014

(54) FLUID DYNAMIC BEARING HAVING PRESSURE-GENERATING SURFACE PATTERNS

(71) Applicant: Minebea Co., Ltd., Kitasaku-gun, Nagano-ken (JP)

(72) Inventor: Martin Bauer, Villingen-Schwenningen (DE)

(73) Assignee: Minebea Co., Ltd., Nagano-Ken (JP)

(*) Notice: Subject to any disclaimer, the term of this patent is extended or adjusted under 35 U.S.C. 154(b) by 0 days.

(21) Appl. No.: 14/049,759

(22) Filed: Oct. 9, 2013

(65) Prior Publication Data

US 2014/0037233 A1   Feb. 6, 2014

Related U.S. Application Data

(63) Continuation of application No. 12/069,679, filed on Feb. 12, 2008, now Pat. No. 8,585,290.

(30) Foreign Application Priority Data

Feb. 23, 2007   (DE) .......................... 10 2007 008 860

(51) Int. Cl.
  *F16C 32/06*   (2006.01)
  *F16C 17/10*   (2006.01)
  *F16C 33/10*   (2006.01)

(52) U.S. Cl.
  CPC .............. *F16C 17/107* (2013.01); *F16C 33/107* (2013.01); *F16C 33/1085* (2013.01)
  USPC .......................................... 384/107; 384/121

(58) Field of Classification Search
  CPC .... F16C 17/045; F16C 17/102; F16C 17/107; F16C 32/0659; F16C 33/107; F16C 33/1085
  USPC ............ 384/100, 107, 112, 121, 123; 310/90; 360/99.07, 99.08
  See application file for complete search history.

(56) References Cited

U.S. PATENT DOCUMENTS

| | | | |
|---|---|---|---|
| 3,328,094 A | 6/1967 | Muijderman | |
| 3,870,382 A | 3/1975 | Reinhoudt | |
| 5,847,479 A | 12/1998 | Wang | |
| 6,071,014 A | 6/2000 | Lee | |
| 6,379,047 B1 | 4/2002 | Lee | |
| 6,939,047 B2 | 9/2005 | Gomyo | |
| 6,971,798 B2 | 12/2005 | Hayashi | |

(Continued)

FOREIGN PATENT DOCUMENTS

| | | |
|---|---|---|
| DE | 19888825 | 7/1968 |
| DE | 10226016 | 1/2004 |

(Continued)

*Primary Examiner* — James Pilkington
(74) *Attorney, Agent, or Firm* — Cooper & Dunham LLP

(57) ABSTRACT

A fluid dynamic bearing system having pressure-generating surface patterns that comprises at least two bearing parts that are rotatable with respect to one another and form a bearing gap filled with bearing fluid between associated bearing surfaces. The surface patterns are disposed on at least one bearing surface that is defined by a first rim and a second rim, hydrodynamic pressure being built up within the bearing gap on rotation of the bearing parts with respect to one another. At least parts of the surface patterns extend from the first rim to the second rim of the bearing surface.

15 Claims, 7 Drawing Sheets

(56) References Cited

U.S. PATENT DOCUMENTS

| | | |
|---|---|---|
| 7,568,839 B2 | 8/2009 | Gotoh |
| 2004/0032821 A1 | 2/2004 | Winterhalter |
| 2004/0070298 A1 | 4/2004 | Aiello |
| 2004/0223673 A1 | 11/2004 | Tiller |
| 2005/0074191 A1 | 4/2005 | Braun |
| 2005/0219742 A1 * | 10/2005 | Herndon et al. ........... 360/99.08 |
| 2006/0093245 A1 | 5/2006 | Han |
| 2006/0126981 A1 | 6/2006 | Barforoshi |
| 2006/0140520 A1 | 6/2006 | Aiello |
| 2006/0222276 A1 | 10/2006 | Uenosono |

FOREIGN PATENT DOCUMENTS

| | | | |
|---|---|---|---|
| DE | 102005032630 | | 2/2007 |
| WO | 0204825 | | 1/2002 |
| WO | WO2005/078295 | * | 8/2005 |

* cited by examiner

Fig. 1  State of the Art
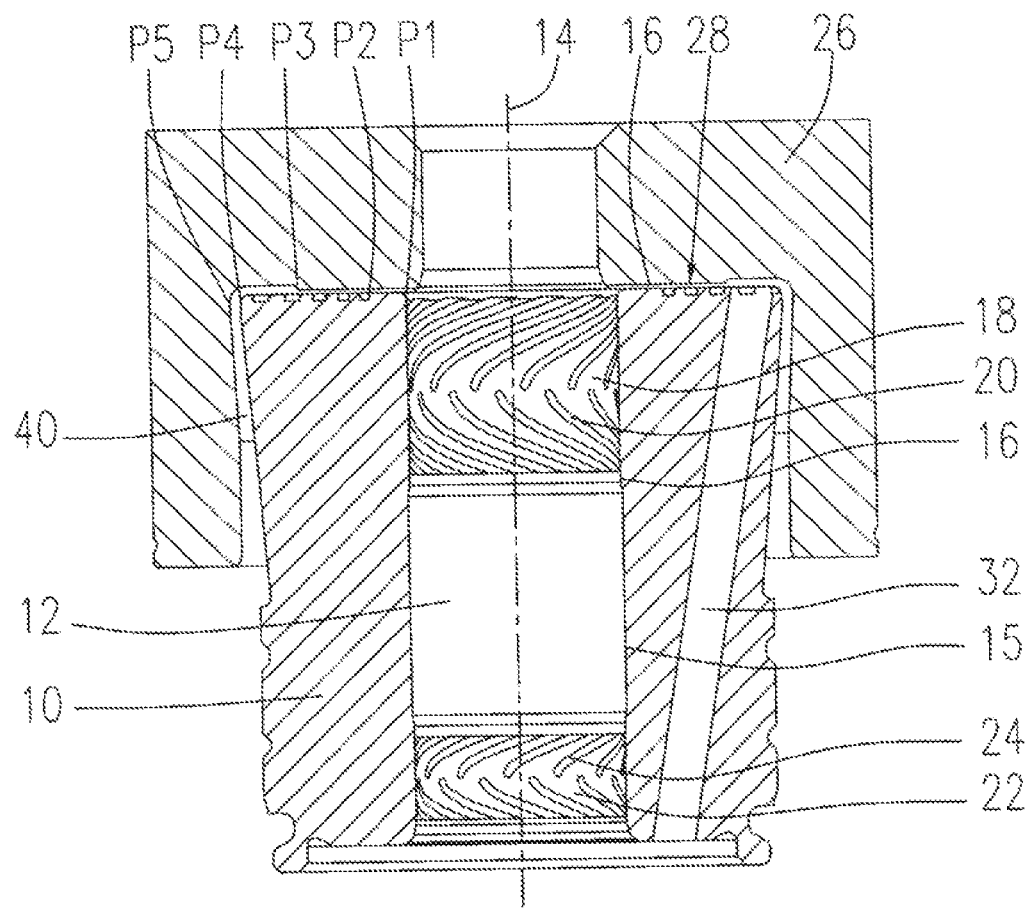
Fig. 1a  State of the Art
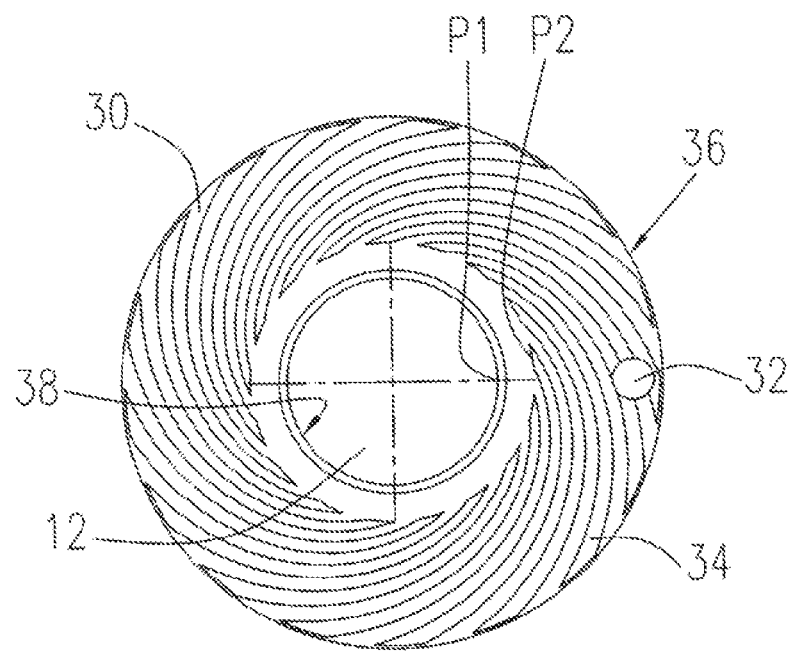

FLUID DYNAMIC BEARING HAVING PRESSURE-GENERATING SURFACE PATTERNS

CROSS-REFERENCE TO RELATED APPLICATION

This application is a continuation of U.S. Ser. No. 12/069,679, filed Feb. 12, 2008, the entire content of which is hereby incorporated by reference.

BACKGROUND OF THE INVENTION

The invention relates to a fluid dynamic bearing, particularly an axial bearing, having pressure-generating surface patterns according to the characteristics set forth in the application. These kind of fluid dynamic bearings are used to rotatably support spindle motors that in turn are used to drive hard disk drives.

PRIOR ART

Fluid dynamic bearings generally comprise at least two bearing parts that are rotatable with respect to each other and form a bearing gap filled with a bearing fluid, e.g. air or bearing oil, between associated bearing surfaces. Surface patterns that are associated with the bearing surfaces and that act on the bearing fluid are provided using a well-known method. In fluid dynamic bearings, the surface patterns taking the form of depressions or raised areas are formed on one or both bearing surfaces. These patterns formed on the appropriate bearing surfaces of the bearing partners act as bearing and/or pumping patterns that generate hydrodynamic pressure within the bearing gap when the bearing parts rotate with respect to each other. In the case of radial bearings, sinusoidal, parabolic or herringbone surface patterns are used, for example, which are distributed perpendicular to the rotational axis of the bearing parts over the circumference of at least one bearing part. In the case of axial bearings, surface patterns are used, for example having a spiral shape, which are mainly distributed perpendicular about a rotational axis. In the case of a fluid dynamic bearing for a spindle motor for driving hard disk drives, a shaft is mostly rotatably supported in a bore in a bearing bush. The shaft may have a diameter of only a few millimeters, for example.

In the case of metallic bearing components, the surface patterns are worked into the surfaces using a process such as ECM (Electro Chemical Machining) in that material is removed from these areas thus creating groove patterns having a depth of approximately 10 to 20 micrometers. This corresponds to approximately 1.5 times the operating bearing gap.

FIG. 1 shows a fluid dynamic bearing system according to the prior art. The bearing system comprises a stationary bearing bush 10 that has a central bore 12. A shaft (not illustrated) is inserted into the bore in the bearing bush 10, the diameter of the shaft being slightly smaller than the diameter of the bore. A bearing gap 16 remains between the surfaces of the bearing bush 10 and the shaft, the bearing gap comprising two fluid dynamic radial bearings 18, 22 by means of which the shaft is rotatably supported about a rotational axis 14 in the bore 12 of the bearing bush 10. The radial bearings are marked by surface patterns 20, 24. The bearing gap 16 is filled with a suitable bearing fluid. A free end of the shaft is connected to a hub 26 whose lower surface, in combination with the end face of the bearing bush 10, forms a fluid dynamic axial bearing 28. To this effect, one of the surfaces of the axial bearing 28 is provided with surface patterns 34 that, on rotation of the shaft, exert a pumping effect on the bearing fluid found between the hub 26 and the end face of the bearing bush 10, giving the axial bearing 28 its load-carrying capacity. Between the outer rim of the axial bearing 28 and the region of the lower radial bearing 22, a recirculation channel 32 may be provided that connects the relevant regions of the bearing gap 16 to each other and aids the pressure compensation of the bearing fluid within the bearing.

This kind of axial bearing mostly comprises two opposing, largely annular disk-shaped bearing surfaces, the bearing surfaces rotating with respect to one another about a common rotational axis. At least one bearing surface 30 is provided with surface patterns (grooves). According to the prior art as illustrated in FIGS. 1 and 1a, surface patterns are not provided over the entire bearing surface 30, but rather there are zones, particularly at the inside diameter of the bearing surface 30, that remain free of grooves. For the sake of symmetry, both the recessed surface patterns as well as the intermediate spaces grow narrower radially towards the inside.

The surface patterns 20, 24 of the radial bearing 18, 22 end in a narrow bearing gap 16 called the "quiet zone", which is adjoined by a bearing gap having a larger gap distance located between the shaft and the bearing bush, called the separator 15. This separator region 15 of the enlarged bearing gap is situated between the two radial bearings 18, 22. The narrow working gap is approximately 3 to 5 micrometers in the region of the radial bearing 18, 22. With a shaft diameter of a few millimeters, for example, the grooved surface patterns 20, 24 typically have a depth of approximately 4 to 8 micrometers, corresponding approximately to 1.5 times the radial bearing gap distance. The adjoining separator region 15 has a gap distance of approximately 20 to 50 micrometers. Resulting from the increased gap distance the bearing friction is reduced. That leads to a reduced current consumption of the driving electric motor.

Particularly in the case of axial bearings, centrifugal forces that act on the bearing fluid may have a negative impact on the function of the bearing. The influence of the centrifugal forces increases as the rotational speed increases. Due to the pumping effect of the bearing patterns, rotational speeds in spindle motors exceeding 10,000 rpm may cause air dissolved in the bearing fluid to accumulate, particularly in those regions of the bearing surfaces where there are no surface patterns. This can result in the malfunctioning of the bearing since the bearing loses its load-carrying capacity in regions where air is to be found and, in addition, the air displaces the oil in the bearing.

SUMMARY OF THE INVENTION

It is the object of the invention to provide a fluid dynamic bearing, particularly a fluid dynamic axial bearing for a spindle motor used to drive a hard disk drive, that shows improved bearing properties particularly at high rotational speeds, i.e. rotational speeds of over 10,000 rpm.

Preferred embodiments and further advantageous characteristics of the invention are revealed in the subordinate claims.

The fluid dynamic bearing system having pressure-generating surface patterns comprises at least two bearing parts that are rotatable with respect to one another and that form a bearing gap filled with a bearing fluid between associated bearing surfaces. The surface patterns are disposed on at least one bearing surface that is defined by a first rim and a second rim, hydrodynamic pressure being built up within the bearing gap when the bearing parts rotate with respect to each other.

According to the invention, at least parts of the surface patterns extend from the first rim to the second rim of the bearing surface.

Thus according to the invention, regions not having any surface patterns are avoided, particularly on the bearing surface of the thrust bearing. The bearing patterns, taking the form of a groove pattern, preferably extend all the way from a first rim of the bearing surface to a second rim of the bearing surface. The rim of the bearing surface is defined by a transition taking the form, for example, of an edge or a radius. In the case of the disk-shaped bearing surface of an axial bearing, these rims are defined by an outside diameter and an inside diameter. The bearing patterns then preferably extend all the way from the inside diameter to the outside diameter of the bearing surface. According to the invention, the surface patterns should be designed such that the pressure increases monotonically from the outside diameter of the bearing surface towards the inside diameter. At the same time, local surfaces without any surface patterns, such as recirculation channels or supporting surfaces for ECM electrode may be provided. If these surfaces are kept small enough, the bearing function will not be significantly disrupted. The bearing surfaces can either be ring-shaped, such as in the case of an axial bearing, or they may also be cylindrical bearing surfaces, as in the case of radial bearings. Provision can further be made for the progress of the surface patterns from the first rim to the second rim of the bearing surface to be interrupted. The surface patterns may comprise at least two groups of patterns having different designs, only the surface patterns of one group extending all the way from the first rim to the second rim of the bearing surface, with the other patterns having a different length and being made shorter accordingly.

The invention will now be described in more detail on the basis of a preferred embodiment with reference to the drawings described below. Further characteristics, advantages and possible applications of the invention can be derived from this.

BRIEF DESCRIPTION OF THE DRAWINGS

FIG. 1 shows a section through a fluid dynamic bearing of a spindle motor according to the prior art;

FIG. 1a shows a top view of the axial bearing surface of the bearing bush according to FIG. 1;

DESCRIPTION OF PREFERRED
EMBODIMENTS OF THE INVENTION

FIGS. 1 and 1a have already been described in the introductory section of the description and show a fluid dynamic bearing system according to the prior art.

Figure 2:
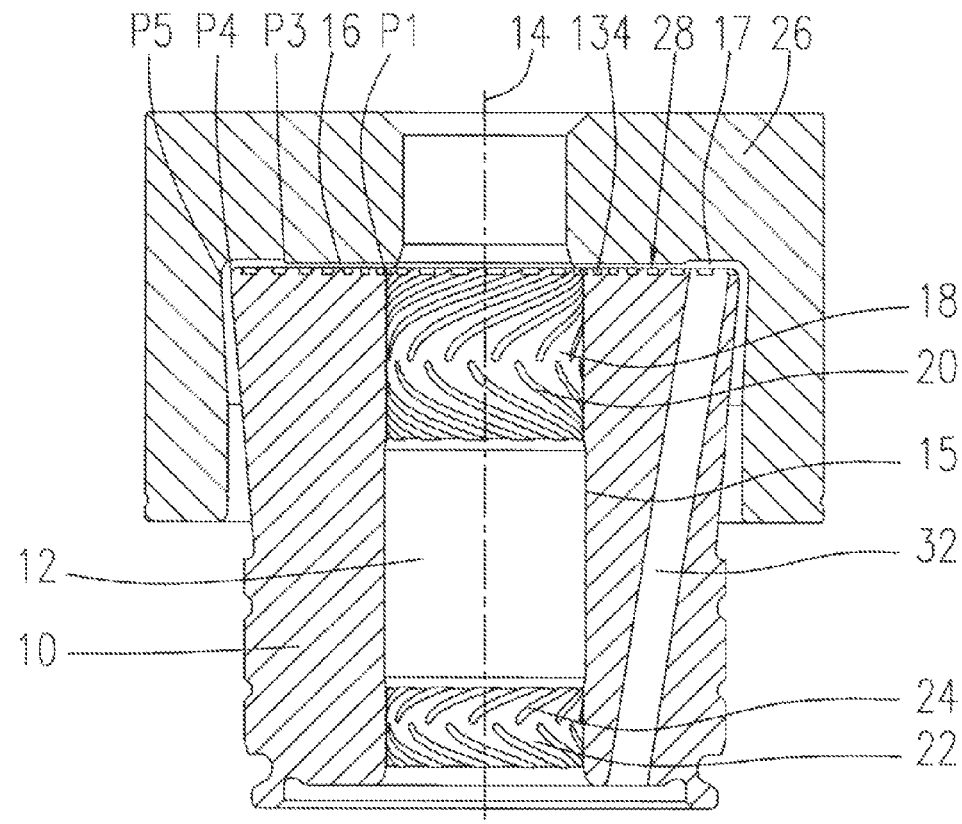
FIG. 2 shows a section through a fluid dynamic bearing for a spindle motor according to the invention.
Figure 2A:
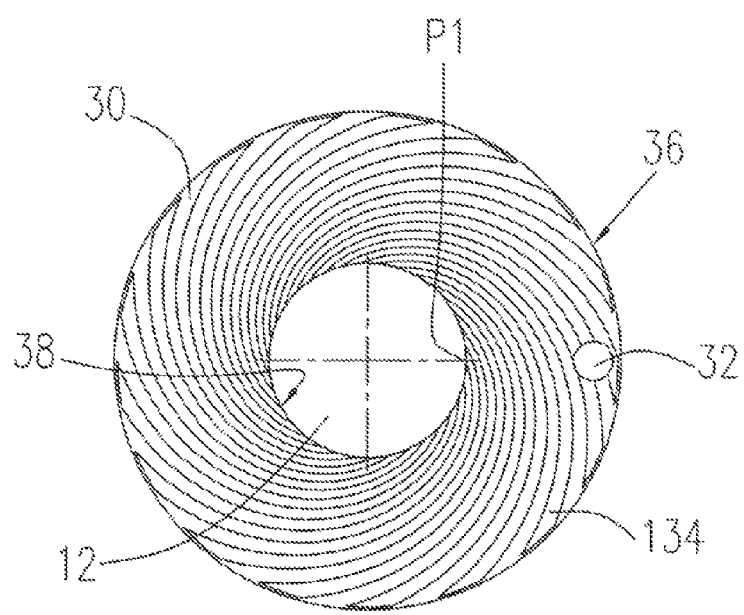
FIG. 2a shows a top view of the axial bearing surface of the bearing bush of FIG. 2.

FIGS. 2 and 2a show a bearing system according to the invention which is largely identical to the bearing system according to FIG. 1. Identical parts are indicated by the same reference numbers. The shaft (not illustrated) is rotatably accommodated in a bore 12 of the bearing bush 10, wherein at its end projecting from the bearing bush 10, the shaft carries a hub 26 whose lower surface in combination with the end face of the bearing bush 10 forms an axial bearing 28, while the shaft and the bearing bush 10 together form two radial bearings 18, 22. The bearing gap 16 extends along the shaft 10 and the radial bearings 18, 22 and then continues along the end face of the bearing bush 10 and the axial bearing 28. At the outside diameter of the axial bearing 28, the bearing gap 16 merges into a gap 17 that has a larger gap distance and acts as a sealing gap and, in addition reduces the bearing friction. Resulting from that, the current consumption of the driving electric motor is reduced. This sealing gap now continues over the outside circumference of the bearing bush 10 and widens conically towards the outside taking the form of a tapered capillary seal. A recirculation channel 32 ends in the region of the gap 17 that has the larger gap distance, the recirculation channel connecting the radially outer region of the axial bearing 28 to the underside of the shaft, thus ensuring pressure equalization and consequently preventing low-pressure zones at the lower end of the shaft.

The bearing is sealed at the lower end of the shaft by a curved plate (not illustrated) that is disposed in the recess in the bearing bush 10 lying opposite the lower end of the shaft. The lower end of the shaft is further connected to a stopper ring (not illustrated) that prevents the shaft from falling out of the bearing bush 10.

In contrast to the prior art, the surface patterns 20, 24 of the radial bearings 18, 22 now end without a quiet zone directly in the separator region 15 of the enlarged bearing gap that is located between the radial bearings.

As can particularly be seen from FIG. 2a, the bearing surface 30 of the axial bearing 28 comprises surface patterns 134 taking the form of spiral grooves. According to the invention, these spiral grooves extend from one outer rim 36 of the bearing surface 30 without any interruption to an inner rim 38 of the bearing surface 30, in contrast to the surface patterns 34 of FIG. 1a that only proceed to a certain distance from the inner rim 38. The number of surface patterns of the radial bearing is preferably less than or equal to the number of surface patterns of the axial bearing.

Figure 8:
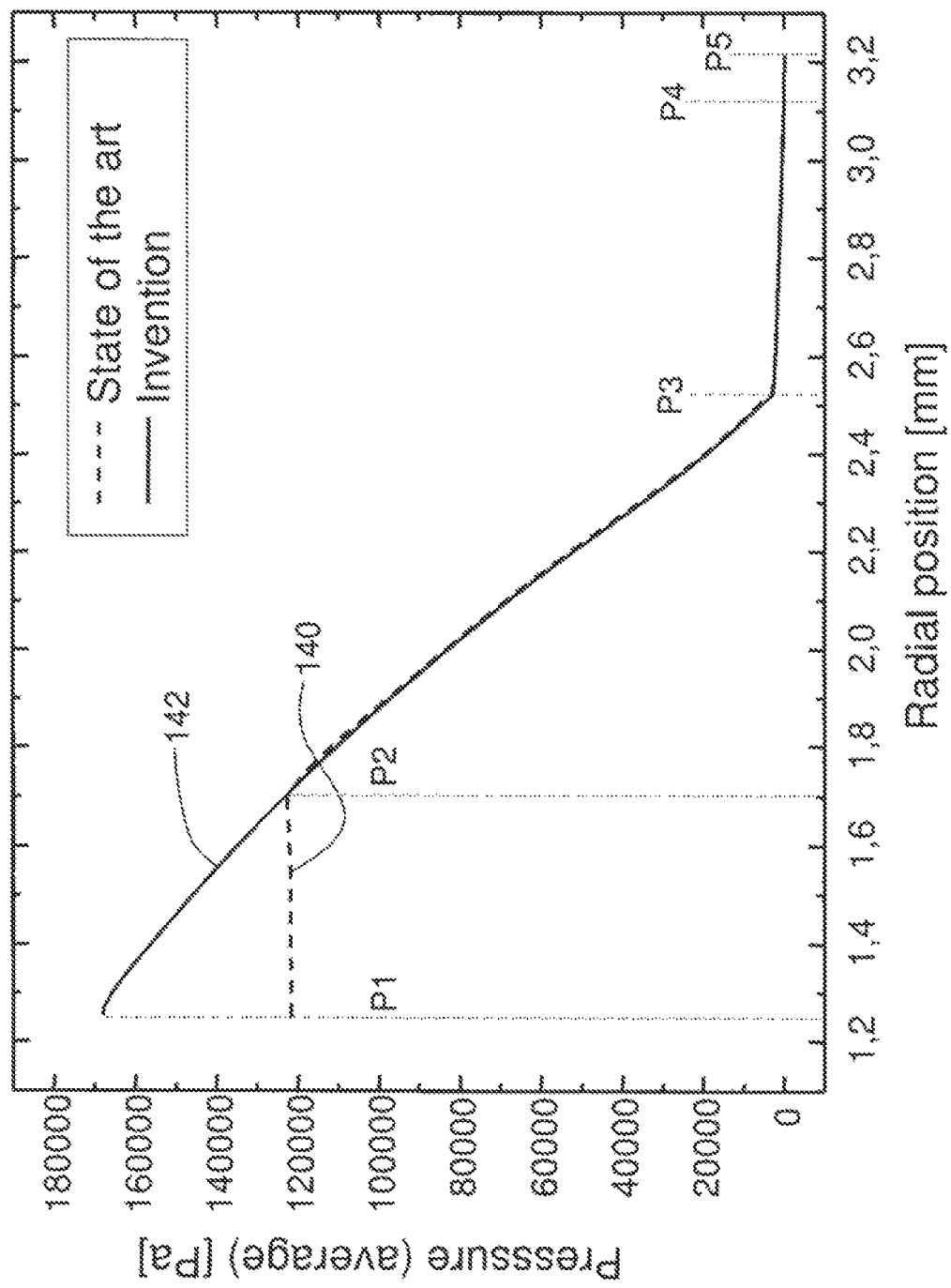
FIG. 8 shows the graph of a simulation of the pressure distribution in the axial bearing gap in the bearings according to FIGS. 1 and 2.

The continuous surface patterns 134 provide an improved pressure characteristic in the axial bearing, as shown in FIG. 8. In FIG. 8, the abscissa plots the radial position, i.e. the distance from the rotational axis 14 in millimeters, and on the ordinate the associated mean pressure in the axial bearing is shown in Pascal. The rotational axis of the axial bearing 28 runs such that a pumping effect is produced by the surface patterns 134 towards the inside in the direction of the rotational axis 14. Curve 140 shows the distribution of pressure in a bearing according to FIG. 1. In the illustrated embodiment, the radius of the axial bearing is approximately 3.2 mm. Outside the axial bearing 28, i.e. in the region of the capillary sealing gap, a pressure P5 prevails that essentially corresponds to the ambient pressure less the pressure difference that is produced by the oil/air contact surface. At the outer region of the axial bearing 28, where the bearing gap is wider, pressure P4 prevails that continuously increases in the direction of the bearing gap to pressure P3, which is only slightly larger than pressure P5. From point P3, the width of the bearing gap 16 narrows to its "operational width" so that from this point onwards the pressure rises continuously the further one gets in the direction of the rotational axis 14.

At the end of bearing patterns 34 in FIGS. 1 and 1b, pressure P2 prevails, i.e. the maximum pressure that can be achieved by this arrangement of $1.2 \times 10^5$ Pa. Since there are no further surface patterns in the direction of the inside diameter, i.e. towards the center of the bearing surface 30, the pressure even drops slightly in this region to point P1 due to the centrifugal effect, as shown by curve 140.

Curve 142 now depicts the pressure characteristic of the axial bearing according to the invention of FIGS. 2 and 2a. At the beginning, the pressure characteristic of this bearing corresponds to the pressure characteristic of the bearing of FIG. 1 up to point P2. In the case of the bearing according to FIG. 1, the end of the surface patterns 34 was reached at point P2. However, in the case of the bearing according to FIG. 2 or 2a, the surface patterns continue from point P2 in the direction of the center of the bearing, so that the pressure according to curve 142 continues to rise from P2 and only at P1 does it achieve its maximum value of approximately $1.7 \times 10^5$ Pa.

Depending on the desired pressure characteristic, there are various design possibilities for the surface patterns on the bearing surface 30. FIGS. 3 to 7 show several examples of such surface patterns that preferably take the form of grooves extending in the shape of a spiral. To make the geometry of the surface patterns more apparent, the lower lying regions (grooves) of the axial bearing are shown dotted in the drawings.

Figure 3:
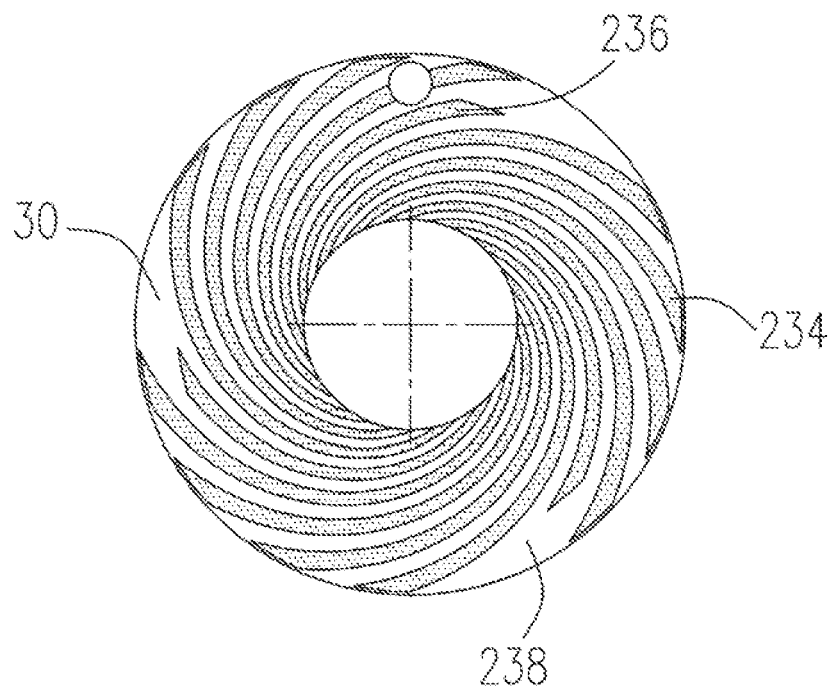
FIG. 3 shows an alternative embodiment of a bearing surface having two groups of surface patterns.

FIG. 3 shows a first possible embodiment of the surface patterns in which two groups of surface patterns are used. The first group of surface patterns 234 extend without a break from the outer diameter of the bearing surface 30 to the inner diameter, whereas the second group of surface patterns 236 only begins at a certain distance from the outer rim 36 of the bearing surface 30 and continues to the inner rim 28 of the axial bearing 28. The surfaces left empty by the surface patterns 236 act as support surfaces 238 for the spacers of an ECM electrode by means of which the surface patterns are formed in the bearing surface 30. The bearing function is only insignificantly impaired by these empty surfaces. These shortened surface patterns 236 preferably extend into the region of the axial bearing gap 17 having the enlarged gap distance.

Figure 4:
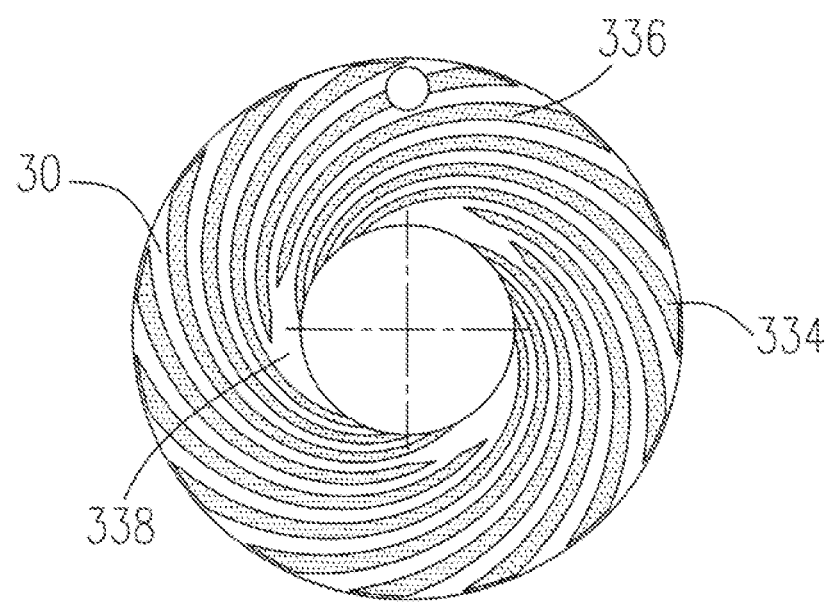
FIG. 4 shows a further embodiment of a bearing surface having two groups of surface patterns.

FIG. 4 shows another embodiment of surface patterns on the bearing surface 30 having a first group of surface patterns 334 that extend all the way from the outside diameter of the bearing surface 30 to the inside diameter, and a second group of surface patterns 336 that start at the outside diameter and do not extend fully to the inside diameter of the bearing surface 30, but rather break off beforehand. Here again, the empty surfaces formed by the shortened surface patterns 336 at the inside diameter act as support surfaces 338 for the spacers of an ECM electrode. The build up of pressure in the radially inner region of the axial bearing is only slightly weakened by this.

Figure 5:
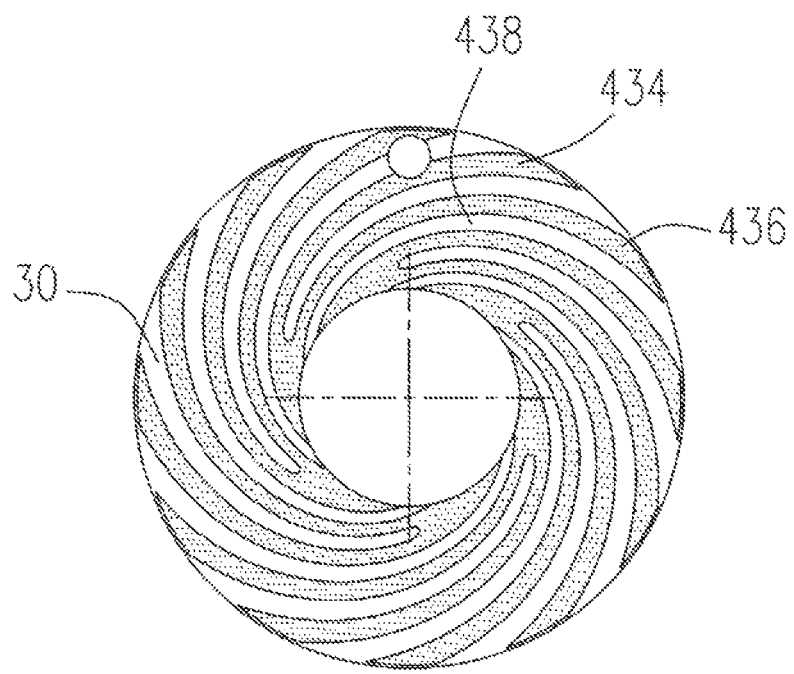
FIG. 5 shows a modified embodiment of a bearing surface having surface patterns.

FIG. 5 shows a further arrangement of surface patterns. Two adjacent surface patterns 434, 436 extend from the outside diameter of the bearing surface 30 in the direction of the inside diameter and join together at a distance from the inside diameter to form a single groove having a larger width. The pairs of grooves 434, 436 are separated from each other by unbroken bridges 438 that extend all the way from the outside diameter to the inside diameter of the bearing surface 30. An even number of surface patterns 434, 436 are preferably used here. The advantage of this embodiment is that the widened grooves are less susceptible to manufacturing inaccuracies that can occur in the ECM process.

Figure 6:
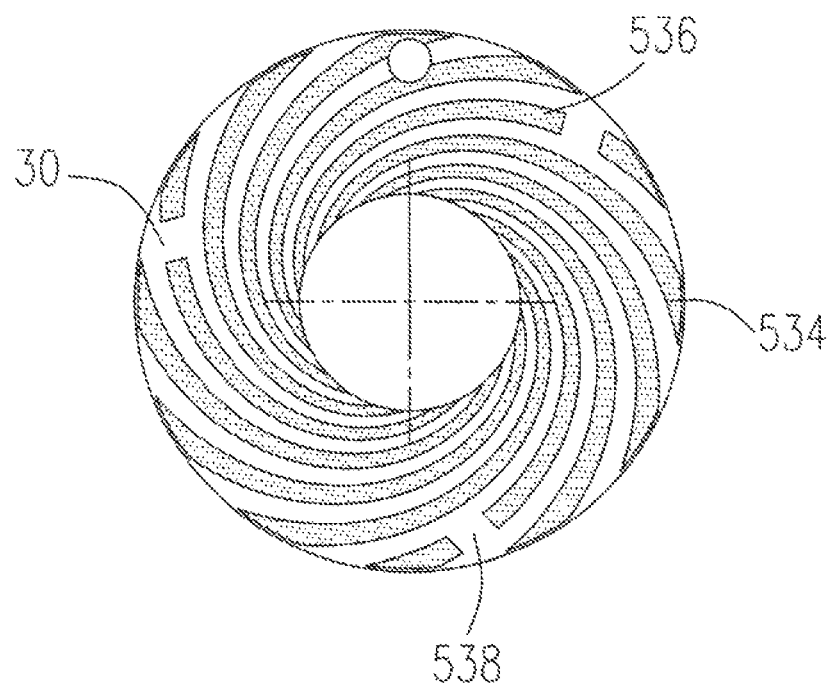
FIG. 6 shows a further embodiment of a bearing surface having two groups of surface patterns.

FIG. 6 shows surface patterns similar to the ones shown in FIG. 3. A first group of surface patterns 536 extends from the outside diameter to the inside diameter of the bearing surface 30 and is interrupted at a distance from the outside diameter, thus creating supporting surfaces 538 for an ECM electrode. A second group of surface patterns 534 extends unbroken from the outside diameter to the inside diameter of the bearing surface 30. The only difference to FIG. 3 is that the supporting surfaces 538 for the ECM electrode are not directly adjacent to the outside diameter of the bearing surface but are disposed at a distance to the outside diameter. These supporting surfaces, i.e. the interruptions in the surface patterns 536, are preferably located in the region of the widened axial bearing gap 17.

Figure 7:
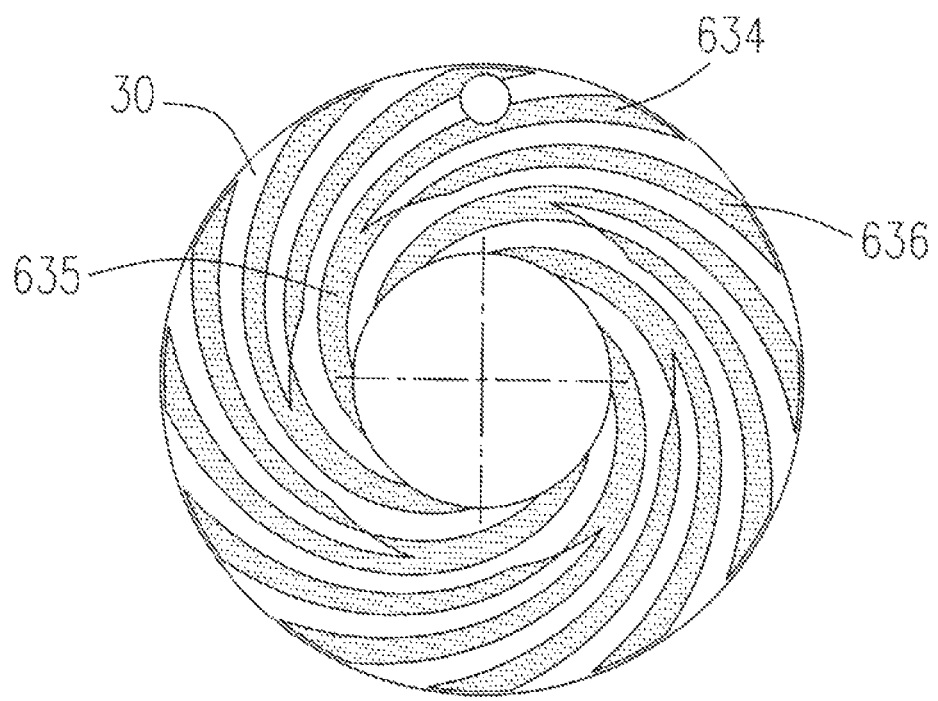
FIG. 7 shows a further embodiment of a bearing surface having two groups of surface patterns.

FIG. 7 shows surface patterns having a first group of surface patterns 634 that extends from the outside diameter to the inside diameter of the bearing surface 30 and comprises two sections. The surface patterns are initially narrower in the direction of the inside diameter for the sake of symmetry, only to then merge from a specific bearing diameter into wider surface patterns 635. A second group of surface patterns 636 extends from the outside diameter not quite fully to the inside diameter of the bearing surface 30. This goes to provide space for the widened surface patterns 635. Consequently, in the radially inner region of the bearing surface 30 there are only half as many surface patterns 635 as in the outer region. There is thus preferably an even number of surface patterns 634, 636 in the outer region.

Depending on the number of shorter and/or widened surface patterns, the pumping effect of the surface patterns and thus the increase of pressure in the bearing fluid can be adjusted between points P2 and P1 accordingly.

Figure 9:
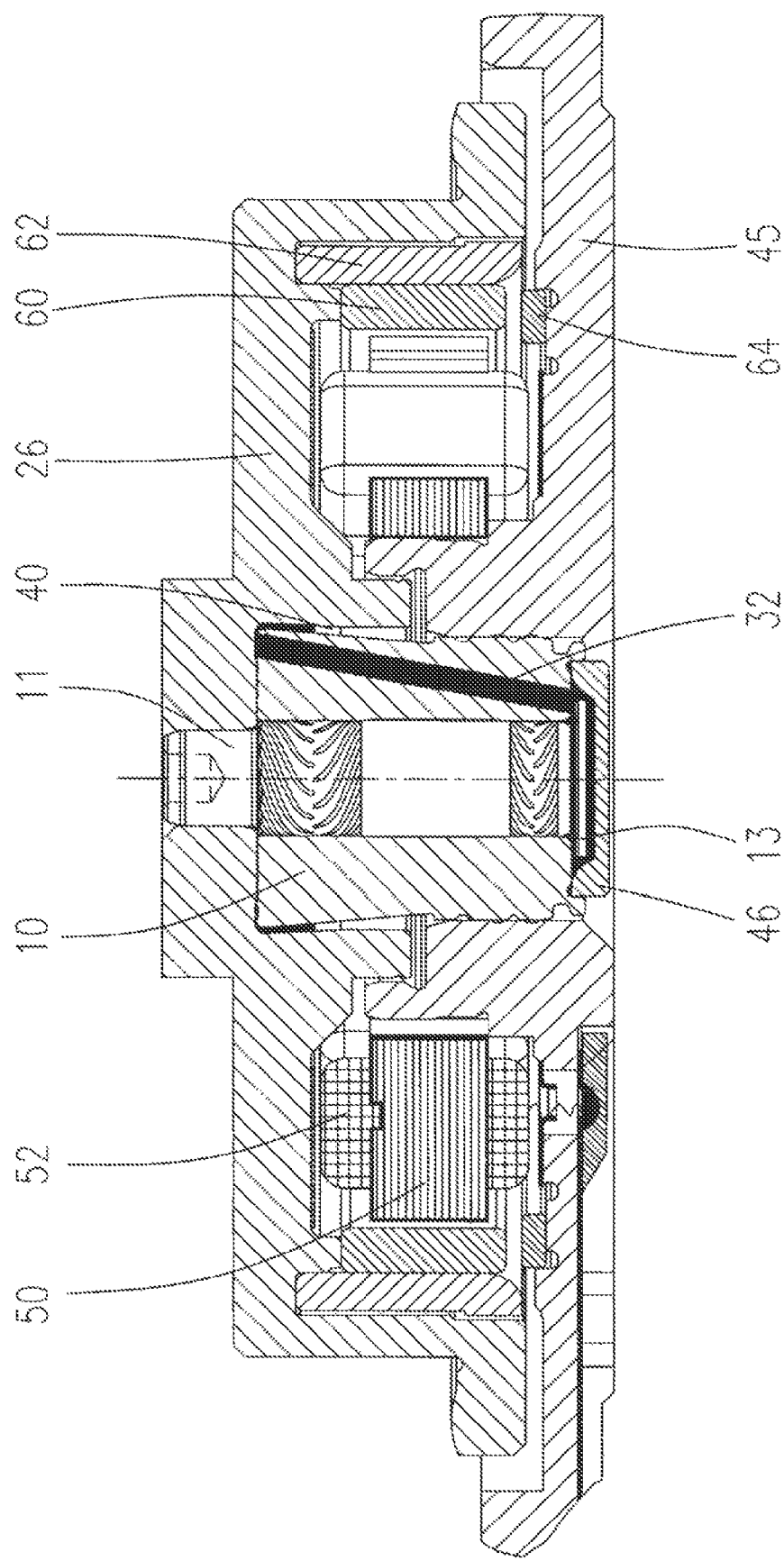
FIG. 9 shows an overall view of a spindle motor having fluid dynamic bearings to drive hard disk drives.

A spindle motor having a fluid dynamic bearing for the purpose of driving magnetic storage disks is illustrated in FIG. 9. The bearing bush 10 is connected to a baseplate 45 and receives a shaft 11 in a central bore 12, which in turn is connected to a hub 26 that carries the magnetic storage disks (not illustrated). A stator that encloses the bearing bush 10 is disposed on the baseplate 45, the stator consisting of a ferromagnetic stack of stator laminations 50 and appropriate windings 52. This stator is enclosed by a rotor magnet ring 60 that is disposed in a back yoke ring 62 having a larger diameter and fixed to the rotor hub 26. An outer rotor motor is illustrated. It is clear that an inner rotor motor may alternatively find application. The central point of the rotor magnet 60 is disposed above the central point of the stator poles, resulting in a force directed downwards towards the baseplate 45. In addition, a ferromagnetic ring 64 is disposed below the rotor magnet 60 on the baseplate 45 that produces a force acting in the same direction.

A stopper ring 13 is disposed at the lower surface of the shaft 11, the stopper ring being formed either integrally with the shaft or as a separate piece and having a larger outside diameter than the diameter of the shaft. At this end of the bearing bush 10, the bearing is closed by a cover plate 46.

REFERENCE NUMBER LIST

10 Bearing bush
11 Shaft
12 Bore (bearing bush)
13 Stopper ring
14 Rotational axis
15 Separator
16 Bearing gap
17 Bearing gap with increased distance
18 Radial bearing
20 Surface patterns
22 Radial bearing 24 Surface patterns
26 Hub
28 Axial bearing
30 Bearing surface
32 Recirculation channel
34 Surface patterns
36 Rim (first)
38 Rim (second)
40 Capillary seal
45 Baseplate
46 Cover plate
50 Stator lamination stack
52 Winding
60 Rotor magnet ring
62 Back yoke ring
64 Ferromagnetic ring
134 Surface patterns
140 Pressure distribution curve (prior art)
142 Pressure distribution curve (invention)
234 Surface patterns
236 Surface patterns
238 Supporting surface
334 Surface patterns
336 Surface patterns
338 Supporting surface
434 Surface patterns
436 Surface patterns
438 Bridge
534 Surface patterns
536 Surface patterns
538 Supporting surface
634 Surface patterns
635 Surface patterns
636 Surface patterns

The invention claimed is:

1. A fluid dynamic bearing comprising:
a bearing bush (10) having a bore (12) therethrough concentric with a rotation axis, said bearing bush defining an annular portion of a stationary bearing surface area surrounding an opening of said bore in said stationary bearing surface area;
a rotatable hub (26) having a hub bore concentric with said rotation axis and communicating with the bore of said bearing bush, said rotatable hub defining an annular portion of said rotatable bearing surface area surrounding an opening of said hub bore therein;
a shaft (11) affixed to said rotatable hub and rotatably accommodated within the bore of the stationary bearing bush; and
an axially facing stationar bearing surface area separated by a fluid bearing gap from an opposed axially facing bearing surface area rotatable on a rotation axis relative to the stationary bearing surface area, said stationary bearing surface area having a plurality of surface patterned grooves adapted to induce hydrodynamic fluid pressure within the fluid bearing gap;
said plurality of surface patterned grooves being formed with spiral-shaped symmetry whereby each groove curves radially between inner and outer boundaries of the annular portion of said one of said stationary and rotatable bearing surface areas and is adapted to induce a hydrodynamic pressure distribution within said fluid bearing gap, each groove of a at least one group of said surface patterned grooves having one end engaging a portion of said inner boundary defined by the circumferential edge of a bore opening, the other end of each groove of said at least one group of surface patterned grooves defining a portion of said outer boundary, one or more other grooves of said surface patterned grooves being interrupted or terminating between said inner and outer boundaries.

2. A fluid dynamic bearing according to claim 1, characterized in that the groove pattern of said group of surface patterned grooves (234; 334; 534; 634) and the groove pattern of said others of said surface patterned grooves (236; 336; 536; 636) have different designs.

3. A fluid dynamic bearing according to claim 2, characterized in that the grooves of said group of surface patterned grooves (234; 334; 534; 634) and the grooves of said others of said surface patterned grooves (236; 336; 536; 636) have different lengths.

4. A fluid dynamic bearing according to claim 1, characterized in that selected pairs of adjacent surface patterned grooves (434, 436) join together over a section of their length to form a common surface pattern groove engaging said circumferential edge.

5. The fluid dynamic bearing of claim 1 in which there are fewer of said interrupted or terminating surface pattern grooves than surface pattern grooves comprising said group of surface patterned grooves.

6. The fluid dynamic bearing of claim 1 in which said surface patterned grooves are formed on said annular portion of said stationary bearing surface area.

7. The fluid dynamic bearing of claim 1 in which said fluid bearing gap between said axially facing stationary and rotatable bearing surfaces merges into an enlarged gap portion encompassing a portion of the stationary bearing surface area adjacent an outer edge of said bearing bush, said enlarged gap portion extending beyond said outer edge and axially around a cylindrical outer surface of said bush to define a conical capillary seal.

8. The fluid dynamic bearing of claim 1 further comprising a radially facing rotatable bearing surface area defined by a cylindrical outer surface of said shaft and separated by an axially extending fluid bearing gap from an opposed radially facing stationary bearing surface area defined by a cylindrical surface of the bore of said stationary bearing bush.

9. The fluid dynamic bearing of claim 8 in which said stationary radially facing bearing surface area comprises a plurality of radially facing surface patterned grooves adapted to induce a hydrodynamic fluid pressure distribution within said axially extending fluid bearing gap.

10. The fluid dynamic bearing of claim 9 in which said plurality of radially facing surface patterned grooves comprises adjacent groups of grooves having spiral-shaped symmetry.

11. The fluid dynamic bearing of claim 9 in which said groups of radially facing surface patterned grooves have spiral-shaped symmetry of different designs.

12. The fluid dynamic bearing of claim 1 comprising a recirculation channel (32) disposed within the bearing bush and connecting said fluid bearing gap to an underside of the shaft to enable equalization of fluid bearing pressure on the shaft.

13. The fluid dynamic bearing of claim 12 in which the recirculation channel (32) is adapted to communicate bearing fluid to a fluid bearing region between the cylindrical outer surface of said shaft and the cylindrical surface of the bore of said stationary bearing bush.

14. The fluid dynamic bearing of claim 13 in which said recirculation channel ends within at least a partial region of the fluid bearing gap separating said annular portions of said axially facing stationary and rotatable bearing surface areas.

15. A fluid dynamic bearing having pressure-generating surface patterns, comprising
- a shaft (11) that is rotatably accommodated in a bore (12) of a bearing bush (10), the shaft comprising an end projecting from the bearing bush, wherein the shaft carries a hub at said end, wherein the bearing bush (10) and the hub (26) are rotatable with respect to one another about a common rotational axis (14), and form a bearing gap (16) filled with a bearing fluid between associated bearing surfaces,
- the fluid dynamic bearing further comprising an axial bearing (28) formed by a lower surface of the hub (26) in combination with an end face of the bearing bush (10), and two radial bearings (18, 22) formed by the shaft and the bearing bush (10),
- wherein said bearing gap (16) extends along the shaft (11) and the radial bearings (18, 22) and continues along an end face of the bearing bush (10) and the axial bearing (28), at an outside diameter of the axial bearing (28) the bearing gap merges into a widened axial gap (17) encompassing a portion of pressure-generating axial surface patterns adjacent said outside diameter of an axial bearing and the widened axial gap having an enlarged gap distance relative to the bearing gap (16) to form a sealing gap while reducing bearing friction, wherein the sealing gap extends over an outside circumference of the bearing bush (10) and widens conically around the outside circumference, thus forming a tapered capillary seal (40),
- the axial bearing comprising pressure-generating axial surface patterns (34; 134; 234; 334; 434; 534; 634) being disposed on a ring-shaped bearing surface (30) of the bearing bush (10) that is defined by an outer rim (36) and an inner rim (38), wherein the inner rim corresponds to the rim of the bore (12) in the bearing bush (10) that receives the shaft (11), and wherein said outer rim (36, 38) is defined by an edge or a radius, wherein at least parts of the surface patterns (34; 134; 234; 334; 434, 436; 534; 634, 635) extend from the outer rim (36) to the inner rim (38) of the bearing surface (30), and
- the radial bearings comprising pressure-generating radial surface patterns (20, 24) disposed on the bore of the bearing bush, and
- a recirculation channel (32) disposed in the bearing bush, the recirculation channel connects the ring-shaped bearing surface to an underside of the shaft such that an opening of the recirculation channel (32) partially intersects at least one surface pattern,
- wherein the recirculation channel (32) is disposed between a region radially inside the outer rim of the axial bearing and a region adjoining a lower radial bearing of the two radial bearings such that the said regions are fluidly connected, and such that pressure compensation of the bearing fluid within the bearing is improved,
- wherein the axial surface patterns (134; 234; 334; 534, 536; 634, 635, 636) take the form of a plurality of symmetrical spiral-shaped grooves, the plurality including at least one spiral-shaped groove (134; 234; 334; 534; 634) extending from the outer rim to the inner rim of the bearing surface, and further including at least one symmetrical spiral-shaped groove (236; 336; 536; 636) that does not extend from the outer rim to the inner rim of the bearing surface, such that fluid pressure increases monotonically from an outside diameter of the axial bearing surface to an inside diameter of the axial bearing surface.

\* \* \* \* \*